United States Patent Office 3,038,943
Patented June 12, 1962

3,038,943
PRODUCTION OF ALKYLDECABORANES
Kiyoshi Hattori, John J. Finn, and Morton J. Klein, Chicago, Ill., assignors, by mesne assignments, to Callery Chemical Company, Pittsburgh, Pa., a corporation of Pennsylvania
No Drawing. Filed Oct. 12, 1959, Ser. No. 846,032
7 Claims. (Cl. 260—606.5)

This invention relates to the production of alkyldecaboranes and more particularly to an improved method for their production in which a catalyst is used to effect faster and more efficient reaction.

The alkyldecaboranes are relatively new compounds of boron in which an alkyl group is substituted for one or more hydrogens of decaborane, $B_{10}H_{14}$. Methods have been developed by which these compounds may be produced, several of the most widely used of which depend upon the reaction of diborane with alkyldiboranes or trialkylboranes at varying conditions of temperature and pressure. Thus, for example, in the copending and coassigned application of Huff et al., Ser. No. 736,437, filed May 13, 1958, there is described a process by which alkyldecaboranes may be prepared from the reaction of diborane with alkyldiboranes at elevated temperatures and superatmospheric pressure. While these processes are valuable and are presently being used to prepare alkyldecaboranes in large quantities, the reactivity and stability of the boron hydrides and their derivatives are such that these processes by which the alkyldecaboranes are prepared also result in undesirable side reactions and some decomposition of the starting materials at the reaction conditions required.

One object of this invention, therefore, is to provide an improvement in the method for the preparation of alkyldecaboranes from diborane and alkyldiboranes or trialkylboranes whereby the process may be carried out using less severe conditions.

Another object is to provide a catalyst which increases the efficiency of the above-described method for the preparation of alkyldecaboranes.

A further object is to provide a method by which high yields of alkyldecaboranes are produced from diborane and alkyldiboranes or trialkylboranes.

Still other objects will become apparent from the following specification and claims.

The basis for this invention lies in the discovery that nickel catalyzes the reaction of diborane with alkyldiboranes or trialkylboranes to produce alkyldecaboranes. This catalyst has been found to be catalytic in a quantitative sense, in that its use results in a higher product yield compared to the yield obtained from uncatalyzed reactions under equivalent conditions. It is also catalytic in a qualitative sense, in that its use results in the production of alkyldecaboranes with little or no production of polyalkylated pentaboranes, which are the chief product of the undesirable side reactions which tend to take place simultaneously with the desired reaction. Furthermore, it has been found that larger amounts of product can be produced at lower temperatures when a nickel catalyst is used, so that it is apparent that this catalyst lowers the energy of activation for the reaction.

The use of the nickel catalyst as described herein is applicable to both batch and flow systems in which alkyldecaboranes are produced from the reaction of diborane with alkyldiboranes or trialkylboranes. However, it appears that this catalyst also has some effect upon the alkyldecaboranes produced and that it tends to induce some decomposition of the product. Therefore, in order to minimize the time during which the product is in contact with the catalyst, it is preferred to contain the catalyst and to carry out the reaction in one zone and to collect the product in another zone. For this reason a flow system is more desirable than a batch system.

Nickel catalysts are commercially available and are used in several industrial reactions. In order to avoid excessive handling and possible contamination, the catalyst is often prepared by supporting a nickel compound upon an inert carrier and then reducing the compound to nickel. Kieselguhr, a diatomaceous earth, is a convenient and readily available support for the nickel catalyst. A procedure by which a nickel on kieselguhr catalyst may be conveniently prepared is described by Covert et al. in Journal of the American Chemical Society, 54, 1651 (1932).

To demonstrate the efficacy of the catalyst as described herein, a number of test runs were carried out in which the effect of several catalysts were evaluated in the reaction of diborane with alkyldiboranes or trialkylboranes. These tests were carried out in both batch and flow systems and demonstrated that a nickel catalyst results in the production of more alkyldecaboranes at lower temperatures and in the production of less polyalkylated pentaboranes than when no catalyst or any of several other catalysts tested were used.

A flow system used in carrying out such tests comprised a three and one-half foot catalyst bed through which was passed diborane at a constant pressure along with either alkyldiboranes or trialkylboranes. Suitable auxiliary apparatus for heating, measuring, sampling and analyzing the product was included in the system. To exemplify the results obtained in these tests, Table I below lists some data which were obtained from the reaction of diborane with a mixture of ethyldiboranes, using equivalent amounts of the reactants in each run. In run 1 no catalyst was used. In runs 2 and 3, nickel on kieselguhr was used as catalyst. The products were separated by gas chromotography and analyzed by infra-red spectroscopic analysis.

Table I

| Run | Time, min. | Temp., °C.[1] | Pressure, p.s.i.g.[1] | Product, mg. | Polyalkylpentaboranes, percent | Ethyldecaboranes, percent |
|---|---|---|---|---|---|---|
| 1 | 89 | 145-117 | 210-185 | 270 | 26.2 | 65.7 |
| 2 | 60 | 149-125 | 204-218 | 622 | 0 | 99 |
| 3 | 30 | 109-98 | 190-210 | 545 | 2.2 | 92 |

[1] The temperature and pressure at both the start and the conclusion of the run are given.

As shown by the data above, run 2 was carried out under essentially the same conditions as run 1 except that the catalyst was used and a somewhat shorter time was taken for the run. Compared with run 1, more than twice the amount of total product was produced in run 2; the product which was obtained contained no detectable polyalkylpentaboranes and nearly all the product recovered consisted of ethyldecaboranes. Run 3 was conducted in a manner similar to that of the previous runs but the conditions chosen were those which in earlier non-catalytic runs had produced very undesirable results. In run 3, furthermore, only one-half the catalyst surface used in runs 1 and 2 was used and the time of the run was only one-third the time that was used in run 1. In spite of these unfavorable conditions, however, twice as much product was obtained in run 3 as was obtained in the non-catalyzed run 1 and only a small amount of polyalkylated pentaboranes was obtained, i.e., less than 10% of that obtained in run 1.

The above data along with data obtained in other tests have shown that nickel definitely catalyzes the reaction of diborane with alkyldiboranes or trialkylboranes to form alkyldecaboranes.

The alkyldecaboranes offer utility as fuels and as chemical intermediates in the synthesis of various boron compounds. When used as fuels their advantages lie chiefly in their high heat of combustion when compared with conventional hydrocarbon fuels, and in their physical characteristics which make them much easier to handle and store than are several of the other known high energy fuels. They can be used in rocket or similar type engines where they are combusted with oxidizing agents such as liquid oxygen, or they can be used as are other fuels in conventional burners, heaters or engines.

According to the provisions of the patent statutes, we have explained the principle and mode of practicing our invention, and have described what we now consider to be its best embodiments. However, we desire to have it understood that, within the scope of the appended claims, the invention may be practiced otherwise than as specifically described.

We claim:

1. In the method for the production of alkyldecaboranes which comprises the reaction of diborane with at least one member of the group consisting of alkyldiboranes and trialkylboranes, the improvement whereby the said reaction is carried out in the presence of a nickel catalyst.

2. The improvement in accordance with claim 1 wherein the said catalyst is present in one zone and the alkyldecaboranes which are produced are collected in another zone.

3. The improvement in accordance with claim 1 in which the nickel catalyst is dispersed upon an inert carrier.

4. In the method for the production of ethyldecaboranes which comprises the reaction of diborane with ethyldiboranes, the improvement whereby the said reaction is carried out in the presence of a nickel catalyst.

5. The improvement in accordance with claim 4 in which the said catalyst is present in one zone and the ethyldecaboranes which are produced are collected in another zone.

6. In the method for the production of ethyldecaboranes which comprises the reaction of diborane and triethylborane, the improvement whereby the said reaction is carried out in the presence of a nickel catalyst.

7. The improvement in accordance with claim 6 in which the said catalyst is present in one zone and the ethyldecaboranes which are produced are collected in another zone.

No references cited.